United States Patent [19]
Jackson et al.

[11] Patent Number: 5,124,955
[45] Date of Patent: Jun. 23, 1992

[54] UNDERWATER COMMUNICATION SYSTEM

[75] Inventors: Donald E. Jackson, Oyster Bay; Ivan M. Kliman, Glen Head, both of N.Y.

[73] Assignee: Unisys Corporation, Blue Bell, Pa.

[21] Appl. No.: 808,020

[22] Filed: Mar. 17, 1969

[51] Int. Cl.[5] .................................. H04B 11/00
[52] U.S. Cl. ......................... 367/134; 367/131
[58] Field of Search ................. 325/28, 30, 40, 45, 325/47, 145, 344; 178/66, 79, 88; 340/5, 171; 367/131, 134

[56] References Cited

PUBLICATIONS

Gillis et al, Sperry Eng. Rev., vol. 19, No. 3, 1966, pp. 25–30.
Berktay et al, The Radio and Elect. Eng., May 1967, pp. 295–304.

*Primary Examiner*—Daniel T. Pihulic
*Attorney, Agent, or Firm*—Seymour Levine; Albert B. Cooper; Mark T. Starr

[57] ABSTRACT

A digital underwater communication system includes a transmitter and a receiver. An oscillator bank in the transmitter generates a plurality of signals, each having a unique frequency. A timed switching matrix selects predetermined combinations of signals from this plurality and a gate passes only those signals within a selected combination that corresponds to the binary value of a bit to be transmitted. A timer commands the switching matrix to select different combinations at each bit time. The receiver contains a filter bank feeding a plurality of channels, each responsive to a different one of a plurality of signals generated in the oscillator bank. A receiver timer, synchronized with the transmitter timer, enables combinations of receiving channels corresponding to the combinations of signals selected by the transmitter switching matrix during that bit time. A decision circuit compares the energy in those enabled channels corresponding to a binary ZERO with the energy in those enabled channels corresponding to a binary ONE and applies the result to a suitable readout.

7 Claims, 3 Drawing Sheets

UNDERWATER COMMUNICATION SYSTEM

BACKGROUND OF THE INVENTION

This invention relates to communication systems and more specifically to sonar type underwater communication systems using digital codes.

Underwater communication systems using acoustic signals are known in the art. In such systems, intelligence is conveyed by means of a modulated acoustic wave propagating between immersed transmitting and receiving transducers.

The reliability of such systems, however, is limited since various portions of a given signal may travel along diverse paths before reaching the receiver. Thus, a portion of a given signal may pass directly between the transmitter and the receiver whereas other portions may first be reflected from intervening obstacles or refracted because of variable density in the transmission medium.

Because the signal energy travels over diverse signal paths, a short burst of sound energy originating at the transmitter may be received as a group of separate bursts, each having a different transmission delay. Moreover, each path also includes a number of sub-paths. Because of this, the transmission medium causes selective fading. Furthermore, bursts arriving over different paths may have different amplitudes.

SUMMARY OF THE INVENTION

A digitally coded underwater communication system constructed according to the principles of the present invention provides for the simultaneous transmission of acoustic signals over a number of channels at different frequencies. Certain of these channels are reserved for a binary ZERO and others of these channels are reserved for the transmission of a binary ONE. The allotted channel frequencies are changed for each successive information bit and the receiver is sequentially tuned to respond only to the channel frequencies allotted to the corresponding bit time. The total energy received in channels representing a binary ZERO is compared with that received in the channels representing a binary ONE to indicate the binary value of the received signal.

DESCRIPTION OF THE PREFERRED EMBODIMENT

Figure 1:
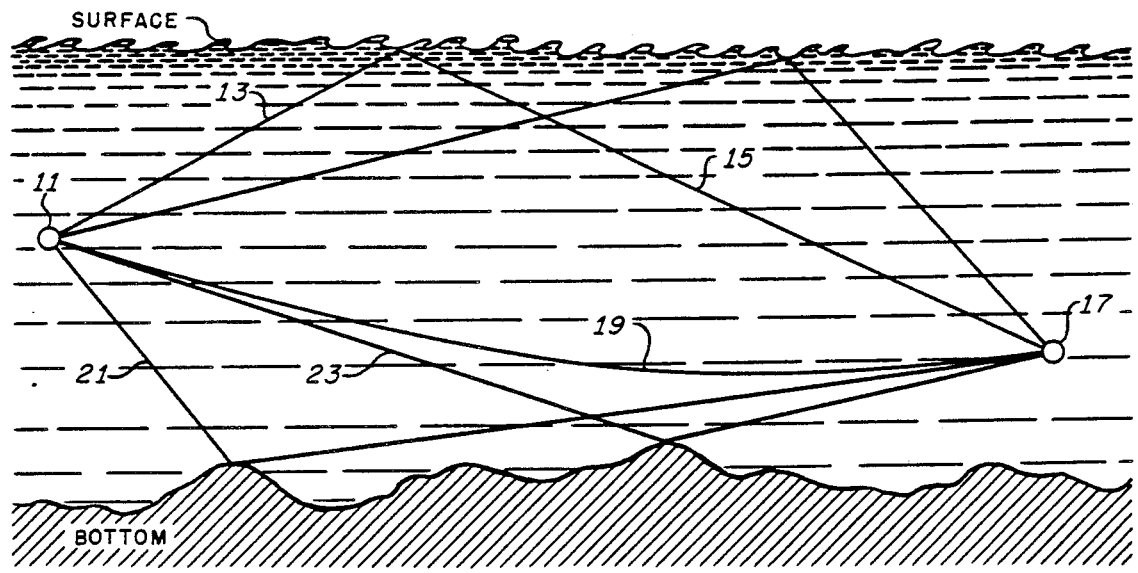
FIG. 1 is a diagram useful in explaining the environment in which the invention is intended to operate.

The diagram of FIG. 1 illustrates how a given pulse may propagate over several paths in reaching the receiver. This multi-path transmission is caused by reflections and refractions. Thus, a transmitter 11 may launch a signal in which one ray 13 propagates towards the surface of the water where it is reflected along a path 15 to reach a receiver 17.

Another ray 19 may be refracted along a curved path because of variable density in the water before reaching the receiver. Still other rays 21 and 23 propagate from the transmitter toward the bottom of the water where they are reflected towards the receiver. Since each path length is different, the times of arrival at the receiver may be spaced over a considerable period of time.

Figure 2:
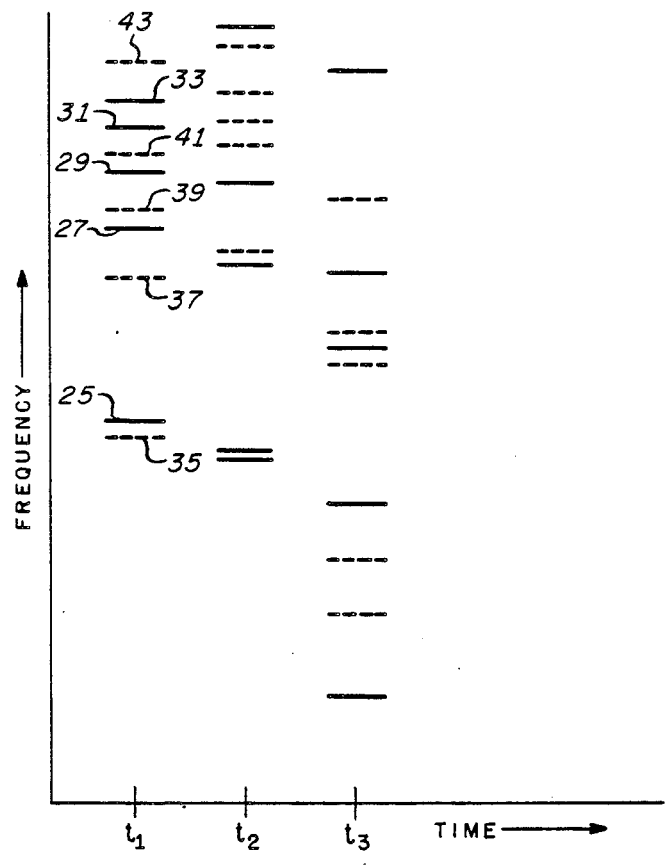
FIG. 2 is a diagram useful in explaining the operation of the present invention.

In the present invention, information to be transmitted is translated into a binary code. The basic mode of transmission may be understood by referring to FIG. 2.

At each bit time, a group of frequencies is selected for conveying information during that time period. A subgroup composed of half of these frequencies is reserved for transmitting a binary ZERO and a second subgroup composed of the second half of these frequencies is reserved for transmitting a binary ONE. Thus, for instance, the frequencies 25, 27, 29, 31 and 33 are assigned for transmitting a binary ONE during bit time $t_1$ whereas frequencies 35, 37, 39, 41 and 43 are reserved for transmitting a binary ZERO during this same bit time.

All of the signals of one subgroup representing either binary value will be transmitted simultaneously during a given bit time.

During bit time $t_2$, a second group of frequencies will be used for transmitting the digital information. Each of the frequencies selected for utilization during time $t_2$ is different from any of the frequencies selected for transmission during time $t_1$. Similarly, different groups of frequencies will be selected for transmission during time $t_3$.

After a bit time has elapsed, a new group of frequencies is selected. The selection process is carried on so that no frequency is repeated for the expected duration of the multi-path transit time.

The receiver is synchronized with the transmitter and sequentially tuned to accept only those signals having frequencies corresponding to those in the group available for transmission during each bit time.

Ordinarily, combinations of frequencies are made available for transmission during succeeding bit times and the frequencies can be altered in a pseudo-random sequence to enhance the secrecy of the transmission.

Figure 3:
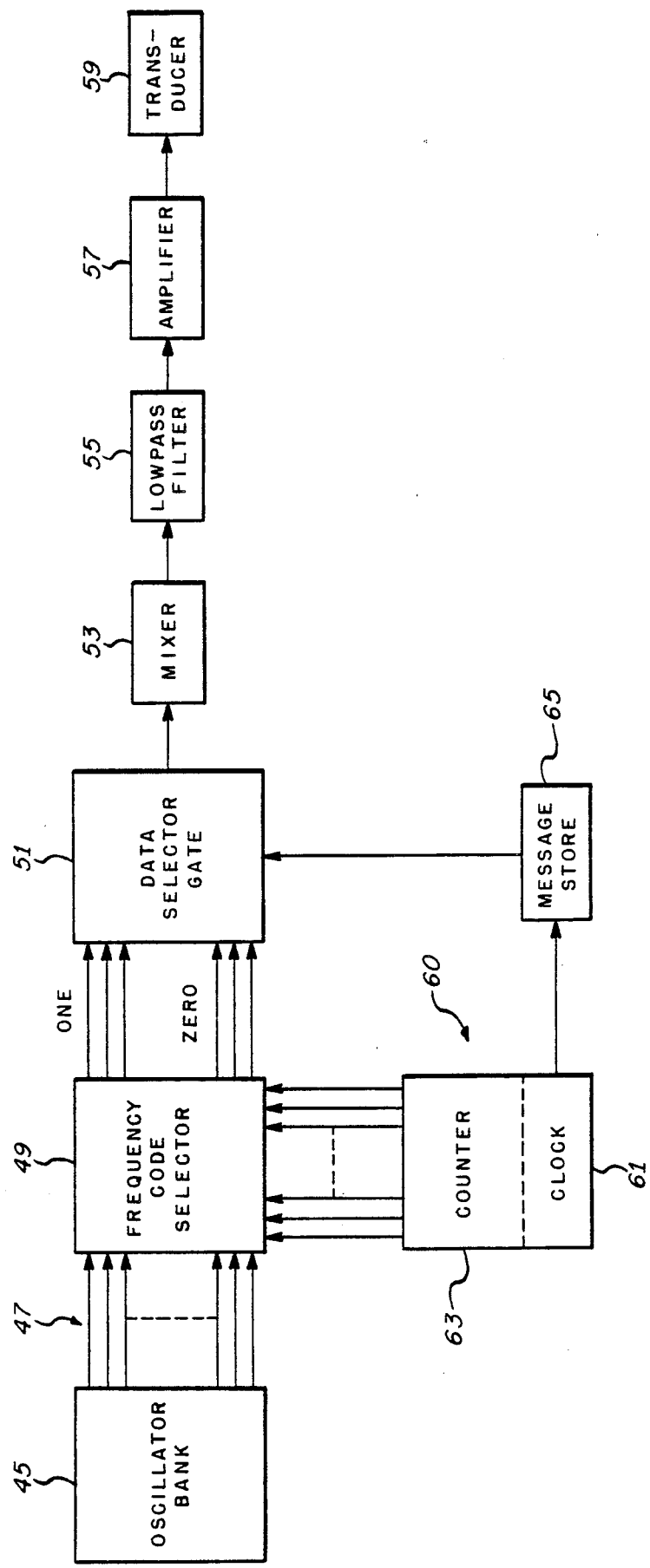
FIG. 3 is a block diagram illustrating a transmitter for use in the present invention.

FIG. 3 illustrates a basic transmitter that may be used in practicing the invention.

An oscillator bank 45 provides a plurality of signals, each at a different frequency and each available over a separate channel in the transmission line 47.

Typically, the oscillator may generate one hundred frequencies, spaced fifteen cycles per second apart, and centered at 80 KHz.

In a practical embodiment, the individual oscillators in the bank may contain known types of magnetostrictive rods energized by suitable magnetic windings. The signals in the transmission line 47 are applied to a frequency code selector 49. This is basically a straightforward switching matrix which selects those frequencies constituting the group which is to be made available for transmission during a given bit time. In a practical transmission system, the binary digit may be simultaneously transmitted over five channels. Thus, the switching matrix 49 will make available a total of ten frequency channels for transmission during each bit time.

During a given bit time the frequency code selector will pass signals corresponding to the appropriate group of frequencies constituting a binary ONE and a binary ZERO during each bit time. All ten of these signals are applied to a data selector gate 51. Depending upon the binary value of the information bit to be transmitted, the signals representing a binary ONE or a binary ZERO will pass through the gate 51 to the mixer 53. The mixer 53 will convert the frequencies in the signal from the gate 51 to frequencies suitable for acoustic transmission. Typically, the mixer will convert the signals centered in the 80 KHz range to signals in the 2-12 KHz range. These signals will pass through a lowpass filter 55 so as to remove the upper sideband. The lower sideband signals are then amplified in an amplifier and range compensator 57. The range compensator is used to adjust the gain of the amplifier 57 to provide a suitable signal for a given transmission range.

The signal from the amplifier 57 energizes a transducer 59 which launches the acoustic signal into the water.

A timer 60 contains a clock 61 that is used to time the transmission intervals. The clock actuates a counter 63 which commands the frequency code selector gate 49 to make predetermined groups of frequencies available for transmission during each bit time.

In a typical transmission scheme, a transmission frame consists of ten bit times. The first and second bit times are reserved for the transmission of binary information that can be used to unlock the receiver as will be explained. The next seven bit times are used for transmitting intelligence and a tenth bit time is reserved for a parity bit.

In order to accomplish this, a conventional counter having ten switching states may be employed and a group of ten output terminals on the counter may be connected to the appropriate connections in the switching matrix.

Clock signals are also applied to a message store 65.

The message store may include any convenient memory system such as a punched tape or magnetic memory that may be used to contain the message to be transmitted. During each bit time, a signal from the message store representing a binary signal of the appropriate value is applied to a gate in the data selector 51 in response to a clock pulse. Thus, during each bit time, a signal representing a binary ONE or a binary ZERO is applied to the mixer 53 so as to permit the corresponding signal to be launched from the transducer 59.

Figure 4:
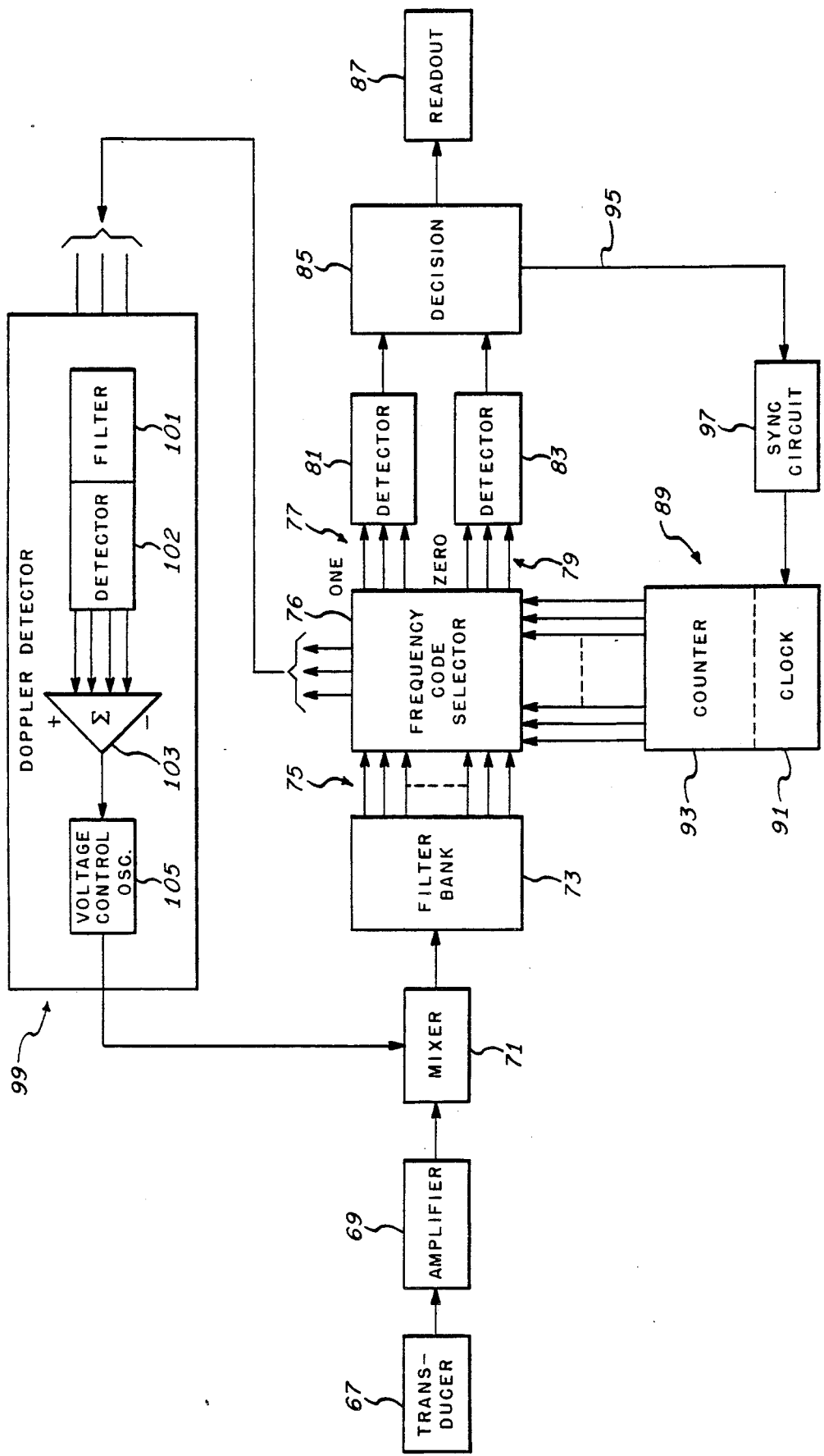
FIG. 4 is a block diagram illustrating a receiver useful in practicing the present invention.

FIG. 4 represents a typical receiver useful in practicing the invention.

The signal is received at the transducer 67, amplified in an amplifier 69 and converted in a mixer 71 to a frequency suitable for use in the electronic system. The signal from the mixer is applied to a filter bank 73. This filter bank may conveniently be the same component that is used as an oscillator bank when the particular apparatus is used for transmission.

The filter bank will pass a number of signals to those individual lines in a transmission line 75 corresponding to the frequencies present in the received signal. These individual signals are applied to a frequency code selector 76. This circuit may be the same frequency code selector that is used in the transmission mode. If the signals from the filter bank match the frequencies that have been selected for that bit time interval, binary ONE or ZERO output signals will be produced on the lines 77 and 79 respectively.

The signals on the line 77 or the line 79 are applied to a detector-limiter 81 or a detector-limiter 83, as the case may be.

Each detector-limiter preferably contains a channel for each of the five signals in the associated subgroup. Each channel includes a square law detector and a limiter. The detector may conveniently be either a conventional linear or square law type. The outputs of the channels in a given detector-limiter are then passed through a summing amplifier to a decision circuit 85.

The detector removes the phase information from the signal. Because of the random nature of the multipaths used, the phase of the transmitted signal becomes severely distorted. Therefore, any attempt to use a phase coherent system for general long-range transmission will be unsuccessful.

The limiters reduce the possibility of a false unlock of the receiver by an exceptionally strong selective noise signal or by an intruder.

The limiter prevents a loud signal frequency corresponding to one of the filter frequencies from unlocking the receiver. The signal plus noise energy containing frequency components corresponding a given subgroup must be greater than the noise energy in the companion subgroup in order to unlock the receiver. Furthermore, the system cannot be accidentally unlocked by a burst of broadband noise since the frequencies of both the binary ONE and binary ZERO bits would be spread across the entire transmission band. This noise would appear as an increase in background noise in both channels and therefore be cancelled.

The decision circuit compares the output of the two detectors and passes a readout signal to a readout means 87 depending upon which signal from the detectors 81 or 83 predominates.

A timing means 89 composed of a clock 91 and a counter 93 determines which channels are to be made available for reception during succeeding bit times. The timing means 89 is adjusted to enable the same frequency groups in the same sequence as the transmitter timer 60.

The clock 91 is set to produce a nominal frequency the same as the frequency of the clock used in the transmitter. The clock 91, however, may use a voltage controlled oscillator as a signal source. When signals are received by the decision circuit 85, an output signal is applied to a line 95. This signal may be differentiated in a synchronizer circuit 97 so as to produce a short duration synchronizing signal which tends to adjust the clock frequency in accordance with variations in timing of the received signal from the nominal signal. Thus, the receiver clock frequency will remain slaved to the repetition rate of the received signal even though this repetition rate is distorted by Doppler or other effects.

The counter is preset so that it commands the frequency code selector to reside in the condition for the reception of the subgroup of frequencies reserved for a binary ZERO during bit time $t_1$. If such signals are received, the counter is switched to its second state and the frequency code selector is commanded to receive signals reserved for the reception of a binary ZERO during the second bit time.

These two bit times are used to unlock the receiver. Thus, during periods between transmissions, the receiver is in a standby condition. Upon the reception of two successive groups of signals corresponding to binary ZEROES for bit times 1 and 2, the counter is started so that during the next seven bit intervals a code conveying the desired intelligence may be received. After unlock, the signal in line 95 is used to maintain synchronization with the received signal as explained above.

A Doppler detector 99 is used to adjust the frequency of the mixer to compensate for changes in the frequency of the received signals due to transmission abnormalities.

The detector 99 adjusts the local oscillator frequency so that the output signals from the mixer 71 fall in the center of the passbands of the appropriate filters in the filter bank.

This can be accomplished by straightforward frequency discrimination techniques. As illustrated in FIG. 4, for instance, signals may be taken from those individual gates in the frequency code selector circuit 76 that correspond to binary ZERO for bit time ONE.

These signals are applied to a frequency discriminator that typically may contain two sets of five receiving filters 101. The filters in the first and second sets of filters are tuned to frequencies slightly above and slightly below the nominal bit one ZERO frequencies, respectively. The output signals from the filters are detected in a detector 102 and the output of the two sets is compared in a differential amplifier 103. If the received frequencies depart from the nominal frequency, an error signal is produced that adjusts the frequency of a voltage control oscillator 105 so as to provide signals having frequencies in the center of the passband of the appropriate filters.

By selecting frequencies that are sufficiently separated, the fading of each signal has been found to be practically independent of the others.

The detectors in the detector-limiters 81 and 83 provide input signals to the decision circuit 85 that represent the total energy in the appropriate subgroup. Either linear or square law detectors may be used for this purpose. The detectors remove the phase information prior to summing the signal energy from each filter and thus eliminate problems associated with multipath transmission.

Since a given set of receiver filters are used only during the bit time corresponding to the receipt of that bit over a dominant multipath, signals arriving as a result of that bit but travelling over different paths having different propagation times are ignored by the receiver thus providing protection against multipath interference.

Furthermore, since the receiver compares the total signal plus noise energy received during a given bit time in the channel carrying the transmitted signal with the total noise energy in the other channel, a correct decision can be made even if all of the received frequencies are not present during a given bit time. It is necessary only that the total signal plus noise energy exceed the noise in the other frequency set.

While the invention has been described in its preferred embodiment, it is to be understood that the words which have been used are words of description rather than limitation and that changes within the purview of the appended claims may be made without departing from the true scope and spirit of the invention in its broader aspects.

We claim:

1. A digital system for underwater communication comprising transmitting means; receiving means; immersible transmitting and receiving transducers coupled to said transmitting and receiving means respectively; said transmitter including:
   an oscillator bank for generating a plurality of signals, each signal having a unique frequency;
   transmitter switching means for simultaneously selecting a predetermined group of signals from said plurality, said group being composed of subgroups, wherein each subgroup represents an information bit to be transmitted;
   means to energize said transmitting transducer with a signal corresponding to all of the signals in a selected subgroup;
   said receiver including:
   a plurality of frequency selective channels, each of said channels being responsive to a different one of the signals in the plurality generated in said oscillator bank;
   receiver switching means for enabling only the group of channels corresponding to a group selected by said transmitting means;
   means for summing the signals flowing in those channels corresponding to a given subgroup; and
   means for comparing the summed signals corresponding to the different subgroups in an enabled group of channels.

2. The apparatus of claim 1 in which the digital code to be transmitted is a binary code, and in which each group of signals is composed of a first subgroup representing a binary ONE and a second subgroup representing a binary ZERO.

3. The apparatus of claim 2 in which said transmitter switching means includes means for sequentially selecting predetermined series of groups of signals from said plurality, said receiver switching means further including means for sequentially enabling that series of channels corresponding to the series of groups of signals selected by said transmitter switching means.

4. The apparatus of claim 3 wherein the transmitter and receiver switching means each include timing means for sequentially selecting said groups of signals and said groups of channels at the bit rate of the digital word to be transmitted.

5. The apparatus of claim 4 in which said predetermined series includes a sufficient number of groups so that the transmitted signals corresponding to a given group will have reached the receiver before the same group is again selected for transmission.

6. The apparatus of claim 1 in which said summing means includes detector means for removing the phase information from the corresponding signals.

7. The apparatus of claim 6 in which said detector means is a square law detector and in which said summing means further includes a limiting means for blocking the passage of that portion of a received signal exceeding a given amplitude.

* * * * *